US006868601B2

(12) United States Patent
Lin

(10) Patent No.: US 6,868,601 B2
(45) Date of Patent: Mar. 22, 2005

(54) CALIBRATION TOOL FOR A VERTICAL FURNACE

(75) Inventor: Yung-Pin Lin, Taichung (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 289 days.

(21) Appl. No.: 10/127,284

(22) Filed: Apr. 22, 2002

(65) Prior Publication Data

US 2003/0196306 A1 Oct. 23, 2003

(51) Int. Cl.$^7$ .......................... B23P 19/00; G01D 18/00
(52) U.S. Cl. ............................ 29/759; 29/760; 73/1.01
(58) Field of Search ...................... 29/759, 760, 407, 29/464, 466, 468; 73/1.79, 1.01, 1.75

(56) References Cited

U.S. PATENT DOCUMENTS 6,463,782 B1 * 10/2002 Shen et al. .................. 73/1.79

* cited by examiner

Primary Examiner—John C. Hong
(74) Attorney, Agent, or Firm—Tung & Associates

(57) ABSTRACT

A calibration tool for centering an inner tube with respect to an outer tube of a vertical furnace for semiconductor manufacturing including a first alignment member having a plurality of engagement surfaces simultaneously movable radially outward an equal radial distance for engagement with a base structure of a vertical furnace to center the calibration tool with respect to the base structure and the outer tube; a second alignment member having a plurality of engagement surfaces simultaneously movable radially outward an equal radial distance to engage the inner tube and to move the inner tube to a position centered with respect to the outer tube of the vertical furnace.

20 Claims, 2 Drawing Sheets

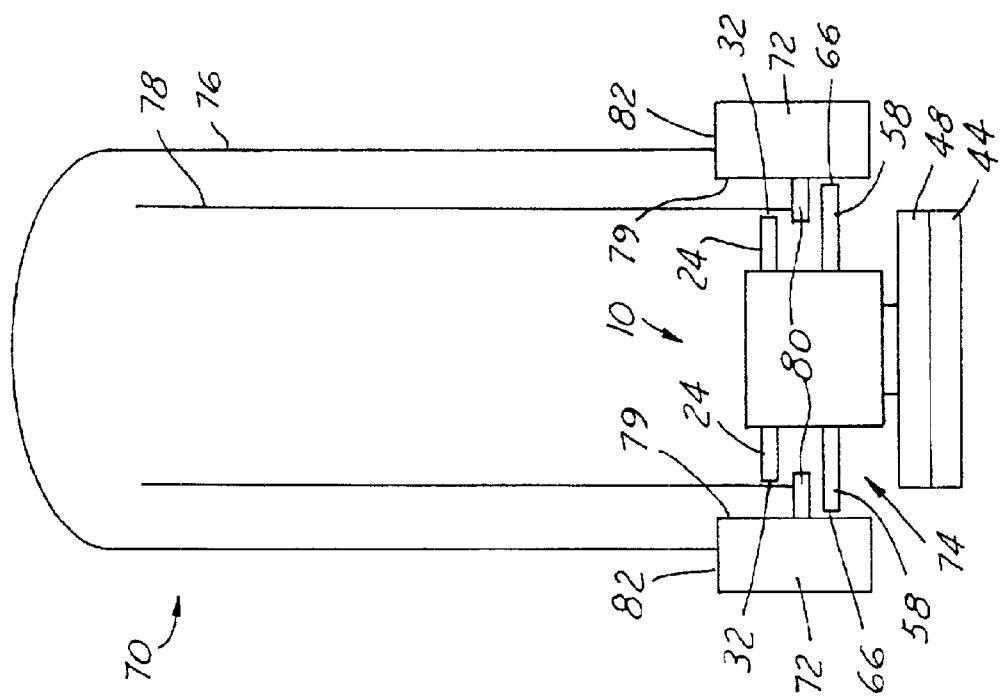
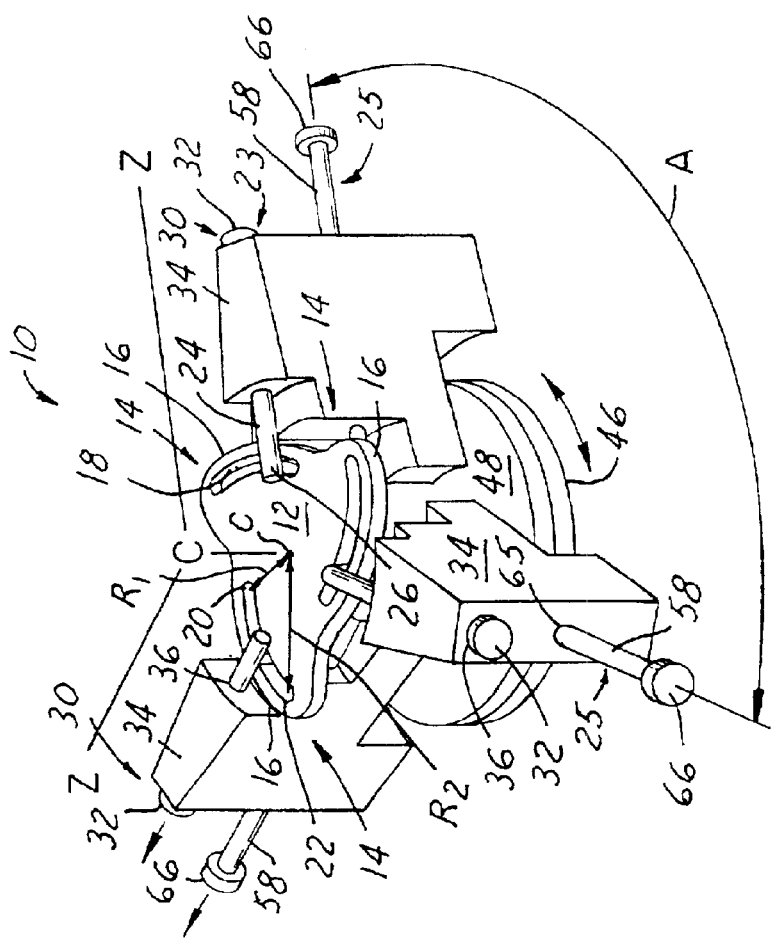

CALIBRATION TOOL FOR A VERTICAL FURNACE

FIELD OF THE INVENTION

This invention relates to a vertical furnace calibration tool and to a method of using the same.

BACKGROUND OF THE INVENTION

Many process steps in the manufacturing of semiconductor devices are conducted in a vertical furnace. A typical vertical furnace system may include a wafer load/unload system which includes a stack of semiconductor wafers and a robotic arm to remove individual wafers from the stack and to load the wafers into a quartz boat. The quartz boat may include a plurality of support arms that extend outwardly from a platen and are designed to hold the semiconductor wafers in a vertically spaced apart arrangement. The platen may have a through hole formed therein. Process byproduct gases may be exhausted through the through hole in the platen and into a conduit so that process waste gases from the vertical furnace can be removed. A quartz boat motor drive system may be provided to raise and lower the quartz boat into and out of the vertical furnace.

The vertical furnace typically includes a quartz bell jar and a quartz inner tube. Heating elements are typically provided on the outside the other quartz bell jar. Process gases are charged through an opening in the quartz bell jar and down into the inner tube and flow over the semiconductor wafers that are in the vertically spaced apart positions in the quartz boat.

The inner tube may have a variety of different configurations depending upon the type of process to be conducted in vertical furnace. For example, the diameter of the inner tube used in the TEOS process may be substantially smaller than the diameter of an inner tube used in a silicon nitride or polysilicon process. Furthermore, the outer and inner tubes may have to be disassembled from each other to clean these components and remove any deposits formed thereon from various processes conducted in the furnace. Upon assembly of the bell jar and the inner tube, often it becomes difficult to properly center of the inner tube with respect to the outer bell jar. Failure to properly center the inner tube with respect to the bell jar may result in a uniformly problem wherein the deposition or growth of a desired material on the semiconductor wafer may have a greater or lesser thickness near the edge of the semiconductor wafer that is closest to the bell jar. This uniformly problem is believed to be due to the fact that one of the edges of the semiconductor wafer is positioned closer to the heating elements surrounding the bell jar and/or the flow of process gases is restricted at the edge of the wafer closest to the bell jar. Thus it would be desirable to provide a vertical furnace calibration tool and a method of using the same to properly center the inner tube with respect to the outer bell jar and to ensure uniformity of deposition or growth of materials over the entire surface of the wafer.

SUMMARY OF THE INVENTION

One embodiment of the invention includes a calibration tool for centering an inner tube with respect to an outer tube of a vertical furnace for semiconductor manufacturing comprising: a first alignment member having a plurality of engagement surfaces simultaneously movable radially outward an equal radial distance for engagement with a base structure of a vertical furnace to center the calibration tool with respect to the base structure and the outer tube; a second alignment member having a plurality of engagement surfaces simultaneously movable radially outward an equal radial distance to engage the inner tube and to move the inner tube to a position centered with respect to the outer tube of the vertical furnace.

Another embodiment of the invention includes a calibration tool for centering an inner tube with respect to an outer tube of a vertical furnace utilized to manufacture semiconductor devices comprising: a first rotatable hub having a plurality of first alignment members, each of the first alignment members having a first engagement surface simultaneously movable radially outward an equal radial distance; and a second rotatable hub having a plurality of second alignment members, each of the second alignment members having a second engagement surface simultaneously movable radially outward an equal radial distance.

Another embodiment of the invention includes a calibration tool wherein the first rotatable hub further includes a slot formed therein for each of the first alignment members, and wherein each of the first alignment members includes a radially movable arm and a downward projection extending from the arm and received in a slot for slidable movement therein.

Another embodiment of the invention includes a calibration tool wherein the second rotatable hub further includes a slot formed therein for each of the second alignment members, and wherein each of the second alignment members includes a radially movable arm and a downward projection extending from the arm and received in a slot for slidable movement therein.

Another embodiment of the invention includes a calibration tool wherein each of the slots has an arcuate shape.

Another embodiment of the invention includes a calibration tool wherein the first hub has a center and wherein each of the slots has a first end and the second end, and wherein the first end is positioned a first radial distance from the center the first hub and the second end of the slot is positioned a second radial distance from the center of the first of hub, and wherein the first radial distance is shorter than the second radial distance.

Another embodiment of the invention includes a calibration tool further comprising a support structure having a plurality of first through holes formed therein, and wherein a first through hole is provided for each radially movable arm and a portion of the radially movable arm being received in one of the first through hole holes for guiding the radially movable arm.

Another embodiment of the invention includes a calibration tool wherein each radially movable arm includes a free end and wherein one of the alignment surfaces is positioned at the free end of each radially movable arm.

Another embodiment of the invention includes a calibration tool further comprising a first shaft attached to the first rotatable hub.

Another embodiment of the invention includes a calibration tool further comprising a first turning disc attached to the first shaft.

Another embodiment of the invention includes a calibration tool further comprising a second shaft concentrically positioned with respect to the first shaft, and the second shaft being attached to the second hub.

Another embodiment of the invention includes a calibration tool further comprising a second turning disc attached to the second shaft.

Another embodiment of the invention includes a calibration tool wherein the first and second turning disc overlying each other, and further comprising bearings positioned between the first and second discs.

Another embodiment of the invention includes a calibration tool wherein each of the first rotatable hub and the second rotatable hub comprise radially extending lobes.

Another embodiment of the invention includes a calibration tool wherein each other lobes further includes a slot formed therein and wherein each of the first alignment members and second alignment members comprising a plurality of radially movable arms and a downward projection extending from each arm and received in one of the slots for slidable movement therein.

Another embodiment of the invention includes a calibration tool wherein the second rotatable hub further includes a slot formed therein for each of the second alignment members, and wherein each of the second alignment members includes a radially movable arm and a downward projection extending from the arm and received in a slot for slidable movement therein.

Another embodiment of the invention includes a calibration tool wherein each of the slots in the second hub has an arcuate shape.

Another embodiment of the invention includes a calibration tool wherein the second hub has a center and wherein each of the slots in the second hub has a first end and a second end, and wherein the first end is positioned a first radial distance from the center of the second hub and the second end of the first slot is positioned a second radial distance from the center of the second hub, and wherein the first radial distance is shorter than the second radial distance.

Another embodiment of the invention includes a calibration tool further comprising a support structure having a plurality of second through holes formed therein, and wherein a second through hole is provided for each radially movable arm of the second hub and a portion of the radially movable arm is received in one of the second through hole holes for guiding the radial movable arm.

Another embodiment of the invention includes a calibration tool wherein each radially movable arm includes a free end and wherein one of the alignment surfaces is positioned at the free end of each radially movable arm.

Another embodiment of the invention includes a method of centering an inner tube with respect to an outer tube of the vertical furnace utilized to manufacture semiconductor devices comprising: providing a vertical furnace having an inner tube and an outer tube; and a base structure having a first surface, a second surface and an inner side wall, and a through hole formed in the base structure and at least partially defined by the inside wall, and wherein the outer tube is supported by the first surface and the inner tube is supported by the second surface; providing a calibration tool for centering the inner tube with respect to the outer tube comprising a first rotatable hub having a plurality of first alignment members, each of the first alignment members having a first engagement surface simultaneously movable radially outward an equal radial distance, and a second rotatable hub having a plurality of the second alignment members, each of the second alignment members having a second engagement surface simultaneously movable radially outward an equal radial distance; inserting the calibration tool into the through hole in the base structure; simultaneously moving the second engagement surfaces radially outward an equal radial distance to engage the inside wall of the base structure and to center the calibration tool with respect to the base structure and the outer tube, and thereafter simultaneously moving the first engagement surfaces radially outwardly an equal radial distance to engage the inner tube and to move the inner tube supported by the second surface so that the inner tube centered with respect to the base structure and the outer tube.

Another embodiment of the invention includes a method of centering an inner tube with respect to an outer tube of the vertical furnace utilized to manufacture semiconductor devices wherein the first alignment members comprises a first set of arms radially movable with the rotation of the first hub and wherein each arm of the first set includes one of the first engagement surfaces, and wherein the second alignment members comprises a second set of arms radially movable with the rotation of the second hub and wherein each arm of the second set includes one of the second engagement surfaces, and wherein the simultaneously moving of the second engagement surfaces radially outward an equal distance to engage the inside wall of the base structure comprises rotating the second hub to radially extending each of the arms of the second set, and wherein the simultaneously moving of a first engagement surfaces radially outward an equal distance to engage the inner tube comprises rotating the first found to radially extending each arm of the first set.

Another embodiment of the invention includes a method of centering an inner tube with respect to an outer tube of the vertical furnace utilized to manufacture semiconductor devices wherein each of the first rotatable hub and the second rotatable hub further comprises arcuate shaped slots formed therein and further comprising a projection extending from each arm and received in one of the arcuate shaped slots for slidable movement therein and wherein each slot has a first end radially positioned a first radial distance from a center of one of the first and second hubs and each slot has a second end radially positioned a second radial distance from a center of the first and second hubs and wherein the first radial distance is shorter than the second radial distance so that the upon rotating one of the first and second hubs the projection moves in a slot from a position nearest the first end to a position nearest the second end causing the arm to move radially outward from the center of one of the first and second hubs.

These and other objects, features, and advantages of the present invention will be apparent from the following brief description of the drawings, detailed description of the preferred embodiments and appended claims and drawings.

BRIEF DESCRIPTION OF THE DRAWINGS

FIG. 1 is a perspective view of the vertical furnace calibration tool according to the present invention;

FIG. 3 is a sectional illustration of the calibration tool according to the present invention used to center the inner tube with respect to the outer tube of a vertical furnace utilized to manufacture semiconductor devices.

DETAILED DESCRIPTION OF THE PREFERRED EMBODIMENTS

Figure 2:
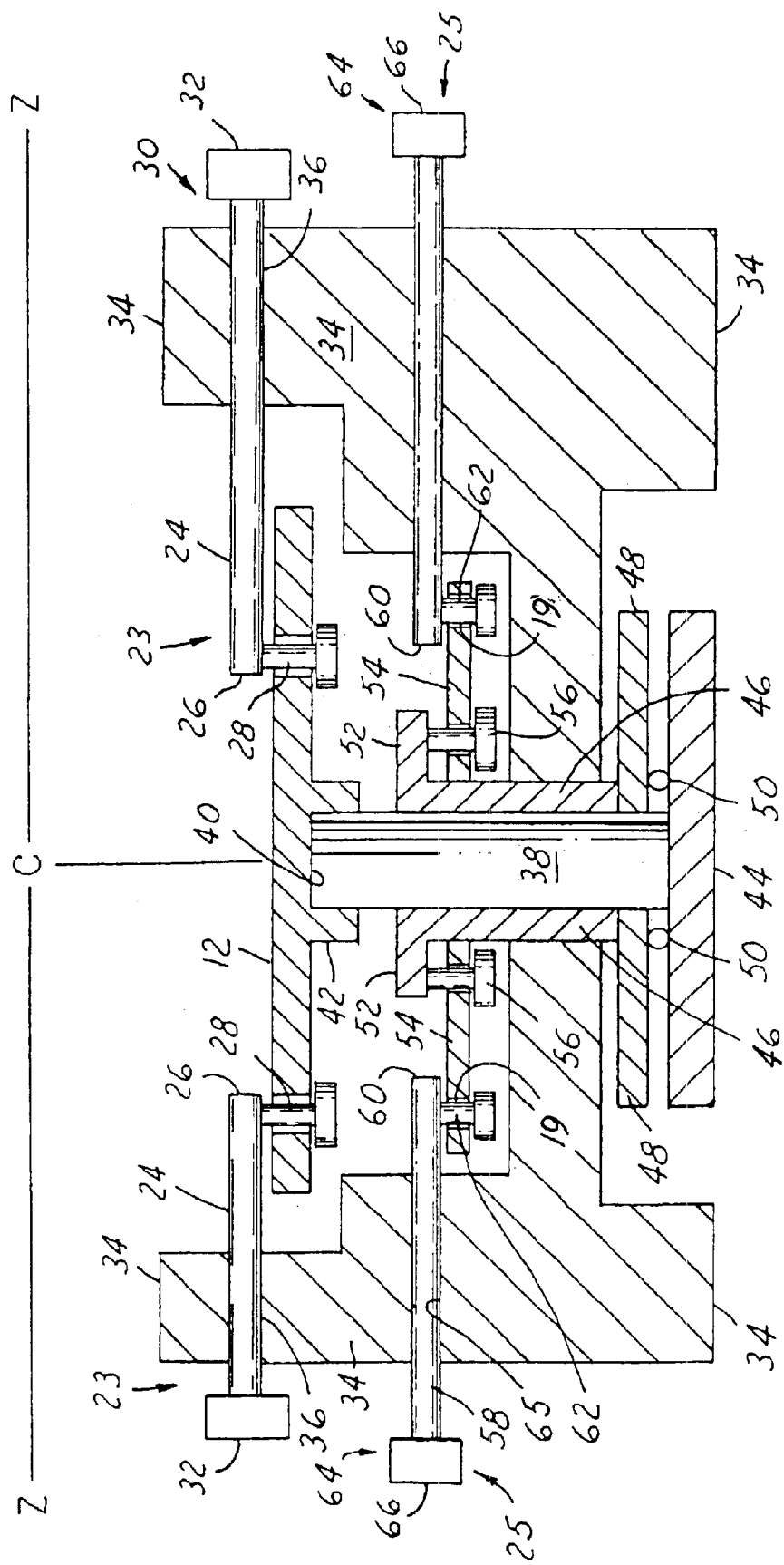
FIG. 2 is a wedge shaped sectional view taken along the points 2-C-2 of FIG. 1.

Referring to FIGS. 1–2, a vertical furnace calibration tool 10 according to the present invention includes a first hub 12 having a center point (C). Preferably the first hub 12 includes a plurality of lobes 14 extending radially outward from the center of the first hub 12. Each lobe 14 may have an outer side 16 which has an arcuate shaped. The hub 12 includes a plurality of slots 18 formed therein, preferably one slot per lobe 14. Each slot 18 may be arcuate shaped having a first end 20 positioned radially a distance $R_1$ from the center (C) of first hub 12. Each slot 18 includes a second end 22 positioned radially a distance $R_2$ from the center (C) of the hub 12. Preferably the radial distance $R_1$ from the first end 20 to the center (C) is smaller than the radial distance $R_2$ from the second end 22 of the slot to the center (C) of the first hub 12.

A movable alignment member 23 is provided. In a preferred embodiment, the movable alignment member 23 includes a radially moveable arm or first rod 24 having a first end 26 which is connected to the first hub 12. As best appreciated from FIG. 2, preferably a downward extending projection 28 is provided near the first end 26 of the first rod 24 so that the downward projection 28 is received in and extends through one of the slots 18 formed in the hub 12. For example, the first end 26 of the first rod 24 may be connected to the hub 12 by the downward projection 28 extending through the slot 18 and threaded into the rod 24 near the first end 26. A support structure 34 may be provided and includes a through hole 36 formed therein through which the first rod 24 travels. The first rod 24 has a second end 30 which includes an alignment surface 32 for engagement with the inner tube of a vertical furnace as will be described hereafter. The first hub 12 is connected to a first shaft 38. As illustrated in FIG. 2, the connection of the first hub 12 to the first shaft may be accomplished by a downwardly extending female nipple having an opening that receives a first end 40 of the first shaft 38. Preferably a first turning disc 44 is connected to the first shaft 38 so that the first shaft 38 and the first hub 12 may be rotated together.

A second shaft 46 is provided and preferably is concentrically configured (positioned) with respect to the first shaft 38. A second turning disc 48 is secured to the second shaft 46 and bearings 50 may be provided so that the second turning disc 48 rides on the first turning disc 44. The second shaft 46 is connected to a second hub 54. The second hub 54 includes a arcuate shaped slot 19 formed in each of a plurality of outwardly extending lobes 14 in the same manner as previously described with respect to the first hub 12. The second shaft 46 may be secured to the second hub 54 in any of a variety of manners known to those skilled in the art. For example, the second shaft 46 may include an outwardly extending flange 52 near a first end. A bolt 56 may extend through the second hub 54 and threaded into the outwardly extending flange 52.

A second movable alignment member 25 is also provided. The second movable alignment member 25 may include a second radially movable arm or second rod 58 having a first end 60 which is secured to a second hub 54. In this case, a bolt 62 extends through a slot 19 in the second hub 54 and is threaded into the second rod 58 near the first end 60. A second through hole 65 may be provided in the support structure 34 through which the second rod 58 travels. The second rod 58 includes a second end 64 having an alignment surface 66.

FIG. 3 is a schematic illustration of a vertical furnace 70 with the calibration tool 10 according to the present invention received in an opening 74 in the vertical furnace 70. The vertical furnace 70 may include a base portion (or base structure) 72 having a central opening 74 formed therein for receiving a semiconductor wafer boat or a calibration tool 10 according to the present invention. The vertical furnace 70 includes an outer tube (quartz bell jar) 76 which may rest on a first surface 82 of the base portion 72. The vertical furnace includes an inner tube 78 received in the outer tube 76. The inner tube 78 may rest on a second surface 80 of the base portion 72. The inner tube 78 may be moved along the second surface 80 of the base portion 72 to center of the inner tube 78 with respect to outer tube 76. Preferably the second surface 80 is substantially flat and is provided by a flange that extends to radially inward from an inner sidewall 79 on the base portion 72.

The calibration tool 10 according to the present invention is inserted into the central opening 74 of the vertical furnace 70 and is positioned so that the second shaft 46 and the second hub 54 may be rotated by turning the second turning disc 48. As a second shaft 46 is rotated, and the projection 62 on the second rod 58 rides (moves) along in the slot 18 from the first end 20 towards the second end 22 of the slot causing the engagement surface 66 of the second rod 58 to move radially outward to engage the inner sidewall 79 of a base structure 72 and to center the calibration tool 10 with respect to the base structure 72 and the outer tube 76. Thereafter, the first shaft 38 and the first hub 12 are rotated by turning the first turning disc 44. In a similar manner as the first hub 12 is rotated, the projection 28 of the first rod 24 rides (moves) along in the slot 18 from the first end 20 towards the second end 22 of the slot 18 so that the first rod 24 extends radially outward and the engagement surface 32 engages the inner tube 78 causing the inner tube 78 to be moved to a perfectly center positioned with respect to the base structure 72 and the outer tube 76 of the vertical furnace 70.

As will be appreciated from the above description, a vertical furnace calibration tool 10 according to the present invention may include a the first alignment member 23 and a second alignment member 25. The first alignment member 23 may include a plurality of engagement surfaces 66 which may be simultaneously moved radially outward an equal distance (or to an equal radial distance from the center of the hub) to engage the base structure 72 of the vertical furnace 70 and to center the calibration tool with respect to the base structure 72 and the outer tube 76. Thereafter, a plurality of engagement surfaces 32 of the second alignment member 25 may be simultaneously moved radially outward an equal distance (or to an equal radial distance from the center of the hub) to engage the inner tube to cause the inner tube to move to a position centered with respect to the outer tube 76.

What is claimed is:

1. A calibration tool for centering an inner tube with respect to an outer tube of a vertical furnace for semiconductor manufacturing comprising:

a first alignment member having a plurality of engagement surfaces simultaneously moveable radially outward an equal radial distance for engagement with a base structure of a vertical furnace to center the calibration tool with respect to the base structure and the outer tube;

a second alignment member having a plurality of engagement surfaces simultaneously movable radially outward an equal radial distance to engage the inner tube and to move the inner tube to a position centered with respect to the outer tube of the vertical furnace.

2. A calibration tool for centering an inner tube with respect to an outer tube of a vertical furnace utilized to manufacture semiconductor devices comprising:

a first rotatable hub having a plurality of first alignment members, each of the first alignment members having a first engagement surface simultaneously movable radially outward an equal radial distance; and a second rotatable hub having a plurality of second alignment members, each of the second alignment members having a second engagement surface simultaneously movable radially outward an equal radial distance.

3. A calibration tool as set forth in claim 2 wherein the first rotatable hub further includes a slot formed therein for each of the first alignment members, and wherein each of the first alignment members includes a radially movable arm and a downward projection extending from the arm and received in the slot for slidable movement therein.

4. A calibration tool as set forth in claim 2 wherein the second rotatable hub further includes a slot formed therein for each of the second alignment members, and wherein each of the second alignment members includes a radially movable arm and a downward projection extending from the arm and received in the slot for slidable movement therein.

5. A calibration tool as set forth in claim 3 wherein each of the slots has an arcuate shape.

6. A calibration tool as set forth in claim 5 wherein the first hub has a center and wherein each of the slots has a first end and the second end, and wherein the first end is positioned a first radial distance from the center the first hub and the second end of the slot is positioned a second radial distance from the center of the first of hub, and wherein the first radial distance is shorter than the second radial distance.

7. A calibration tool as set forth in claim 3 further comprising a support structure having a plurality of first through holes formed therein, and wherein a first through hole is provided for each radially movable arm and a portion of the radially movable arm being received in one of the first through holes for guiding the radially movable arm.

8. A calibration tool as set forth in claim 3 wherein each radially movable arm includes a free end and wherein one of the alignment surfaces is positioned at the free end of each radially movable arm.

9. A calibration tool as set forth in claim 2 further comprising a first shaft attached to the first rotatable hub.

10. A calibration tool as set forth in claim 9 further comprising a first turning disc attached to the first shaft.

11. A calibration tool as set forth in claim 10 further comprising a second shaft concentrically positioned with respect to the first shaft, and the second shaft being attached to the second hub.

12. A calibration tool as set forth in claim 11 further comprising a second turning disc attached to the second shaft.

13. A calibration tool as set forth in claim 12 wherein the first and second turning disc overlying each other, and further comprising bearings positioned between the first and second discs.

14. A calibration tool as set forth in claim 2 wherein each of the first rotatable hub and the second rotatable hub comprise radially extending lobes.

15. A calibration tool as set forth in claim 14 wherein each other lobes further includes a slot formed therein and wherein each of the first alignment members and second alignment members comprising a plurality of radially movable arms and a downward projection extending from each arm and received in one of the slots for slidable movement therein.

16. A calibration tool as set forth in claim 2 wherein the second rotatable hub further includes a slot formed therein for each of the second alignment members, and wherein each of the second alignment members includes a radially movable arm and a downward projection extending from the arm and received in the slot for slidable movement therein.

17. A calibration tool as set forth in claim 16 wherein each of the slots in the second hub has an arcuate shape.

18. A calibration tool as set forth in claim 16 wherein the second hub has a center and wherein each of the slots in the second hub has a first end and a second end, and wherein the first end is positioned a first radial distance from the center of the second hub and the second end of a first slot is positioned a second radial distance from the center of the second hub, and wherein the first radial distance is shorter than the second radial distance.

19. A calibration tool as set forth in claim 16 further comprising a support structure having a plurality of second through holes formed therein, and wherein a second through hole is provided for each radially movable arm of the second hub and a portion of the radially movable arm is received in one of the second through holes for guiding the radial movable arm.

20. A calibration tool as set forth in claim 16 wherein each radially movable arm includes a free end and wherein one of the alignment surfaces is positioned at the free end of each radially movable arm.

* * * * *